UNITED STATES PATENT OFFICE.

LOUIS E. BARTON, OF NIAGARA FALLS, NEW YORK, AND HENRY A. GARDNER, OF WASHINGTON, DISTRICT OF COLUMBIA, ASSIGNORS, BY MESNE ASSIGNMENTS, TO TITANIUM PIGMENT COMPANY, INC., A CORPORATION OF MAINE.

GLASS AND ITS MANUFACTURE.

1,362,917. Specification of Letters Patent. Patented Dec. 21, 1920.

No Drawing. Application filed March 21, 1917. Serial No. 156,296.

*To all whom it may concern:*

Be it known that we, LOUIS E. BARTON, a resident of Niagara Falls, in the county of Niagara and State of New York, and HENRY A. GARDNER, a resident of Washington, in the District of Columbia, both citizens of the United States, have jointly invented certain new and useful Improvements in Glass and Its Manufacture, of which the following is a specification.

Our present invention relates to normally detached articles, or wares, consisting entirely of an independent, unadherent mass of detachedly fused and molded, throughout homogeneous and uniformly constituted glass, and also more particularly to colorless, unopaque, transparent, or "crystal," glass, typified, for example, by what is known in the market as "plate," "flint," "signal," "optical" or "bottle" glass goods; and the objects of our invention comprise economy in the production of, and impartation of superior properties to, such glass.

We are aware that small additions of titanic material, for example, titanic oxid, have heretofore been tried in enamels for metals or ceramics, but in that case, we believe, solely for the purpose and with the effect of imparting opacity or coloration. We are also aware that in production of glazing compositions, or glazes, (enamels), applied in powdered or ultimately pasty, or creamy, state to, and dried and burned upon and into coalescence with and adherence to, iron goods, it has been recommended to add relatively small percentages of the titanic acid, it being asserted that the resulting glaze is more or less transparent, and also that a "dulled" glaze is produced by so employing said acid "in a considerable quantity." In these instances, the known characteristic opaquing and coloring properties of titanic oxid or of titanic acid, or the unimportant interference with transparency of relatively small quantities thereof under certain conditions, have been depended upon and evoked by the usual procedures of enamel, or glaze, manufacture, which are, as is well known, such and so conducted as to insure those conditions as, for example, by spreading the batch in the form of a paste, or of a powder ultimately forming a paste, upon the object thereby coated, and by regulating the temperatures and durations of heating, etc., so as to melt the resulting coating into coalescence with and adherence to said object and effect the final incorporation of the oxid or acid in what would seem to be a suspension in, as distinguished from a chemical combination with, other constituents of the enamel or glass.

Our present invention is based on our discovery that if relatively large quantities of suitably prepared titanic oxid ($TiO_2$), be by aid of the relatively much higher and more protracted temperatures, and the manipulations of the art of glass-making, as distinguished from those of the arts of enameling and glazing, chemically combined with other constituents of the glass under conditions prohibiting therewith combinations, or comminglings, of other elements, or substances, as for example preferably during the by itself isolated formation or melt of, or also in part during its subsequent molding, the thus substitution of titanic oxid for part of the formerly employed materials, as for example the silica, not only increases the fusibility of the charge, and the fluidity of the melt, these results being we find, to an extent, proportional to increase of the amount of the titanic addition to the charge or batch, but also there is thereby obtained a more easily "workable" throughout uniformly translucent, or, if desired, perfectly transparent glass without undue variations of the known ranges of temperatures within which such glass may be expected to remain plastic and workable during its isolated molding by aid of such manipulations of the melt as blowing, casting, pressing, etc.

We are thus, by means of our invention, enabled to beneficially regulate, vary, or reduce, the additions of alkalis, alkali salts, or lead compounds, which have been hitherto relied on, and employed, to impart the respective degrees of fusibility, or fluidity, required for various purposes, and we obtain, in consequence, final glass products which are, during and after making, more resistant than heretofore to chemical action. While our invention enables lead compounds to be dispensed with, as is desirable for certain operations and purposes, our titanic additions may in other cases be usefully employed in association with reduced proportions of said compounds, or of alkali compounds, or sometimes, and preferably, of both. Our incorporations of titanic materials also increase the refractive index of the glass, thus rendering it more suitable for certain optical purposes and effects.

Our titanic additions should, of course, be made in the purest available forms, for example, and preferably, of such amorphous titanic oxid products, chemically uncombined with other substances as are obtainable as precipitates by aid of such procedures as described in Letters Patent granted to Auguste J. Rossi and Louis E. Barton, Nos. 1,106,406, 1,106,407, 1,106,408, 1,106,409 and 1,106,410, dated August 11, 1914, No. 1,166,547, dated January 4, 1916, No. 1,171,542, dated February 15, 1916, and Nos. 1,196,029, 1,196,030 and 1,196,031, dated August 29, 1916; also, to Louis E. Barton, No. 1,189,229, dated July 4, 1916, No. 1,201,541, dated October 17, 1916, and Nos. 1,206,796, 1,206,797 and 1,206,789, dated December 5, 1916.

Our invention is practised and its improved glass products obtained by incorporating the titanic material in the batch, melt, or glass, in any such convenient manner, and in such proportions, as will, in each case, be readily apparent for their purposes to those skilled in an art so familiar as that of making the glass referred to as distinguished from the arts of enameling and glazing. The essentials are to so incorporate the titanic constituent, and under such above described conditions of temperature, etc., as to insure its being, in the product, in a state of chemical combination with other of the heretofore employed solid constituents of such glass and the absence of combinations, or commixtures, therewith of other elements or substances. To this end the titanic oxid may be preliminarily mixed and chemically combined with any of the usual ingredients of such glass suitable for the particular purposes in hand, and the resulting product thereafter introduced into the batch of other usual constituents, or the titanic addition may be made directly to the charge, and the latter being then isolatedly poured, or otherwise placed by itself, in a suitable furnace treated as usual in this particular art, including its melting and manipulation while plastic, as by blowing, casting or pressing, etc., to impart predetermined form and consistency for production of the colorless transparent, unadherent type of glass referred to, the required incorporation and aforesaid chemical combination will take place, and the melts and final products will possess their usually desirable amorphous structure, clear transparence, rigidity, and body sufficient to render them useful independently of any adherence to or coalescence with other objects. The respective proportions of constituents and of the titanic additions will be varied, in each case, in accordance with usual good practice, due regard being had for the properties and effects of such additions as herein disclosed, and the various kinds, and purposes, of final glass products of the types referred to as being improved, as aforesaid, by our invention.

For better understanding, note the following formulæ of proportions of constituents of various charges successfully employed in the practice of our invention, and indicating some of the practical variations permissible in respective proportions of the titanic and other materials.

| Batch numbers. | 2 | 3 | 4 | 5 | 6 | 7 |
|---|---|---|---|---|---|---|
| Silica (parts by weight) | 69 | 69 | 69 | 54 | 39 | 24 |
| Borax (parts by weight) | 10 | 10 | 10 | 10 | 10 | 10 |
| Sodium carbonate (parts by weight) | 29 | 29 | 29 | 29 | 29 | 29 |
| Lime (parts by weight) | 7 | 7 | 7 | 7 | 7 | 7 |
| Titanic oxid (parts by weight) | 15 | 30 | 45 | 15 | 30 | 45 |

The desirable properties imparted by the titanic oxid to our final products are, we believe, largely attributable to the isolation of the glass batch during fusion and the isolation of the resulting melt thereafter and during its molding, whereby is prevented any such combinations with other elements during formation, as occur in enameling and glazing owing to contact of the batch with the foreign objects coated, the result being a vitreous covering which is not throughout homogeneous, not uniformly constituted, but, on the contrary, often contains in proximity to the object elements derived from the latter.

Our titaniferous product resulting from our herein described operation is further distinguishable from the vitreous enamel or glaze coatings of the prior art because, while these consist of a more or less mechanical mixture of solid particles embedded in a more or less vitrified matrix, our product, on the contrary, is as appears from inspection, an independent, i. e. unadherent, isolated, mass of segregated fused and molded glass, which is accordingly uncontaminated or unadulterated by combination or co-mixture with thereto foreign elements or substances during its fusion, and, owing also to comparatively high and protracted temperatures of its formation and aided by its manipulations during molding, is consequently throughout its mass perfectly homogeneous and uniformly constituted, the result being that our glass is equally open to the action of light from any two mutually directly opposite points respectively located in opposite surfaces thereof, i. e. is uniformly translucent, or opalescent, because containing a colloidal solid solution of oxids, or is, as is often preferable, perfectly transparent throughout, the which is not true of enamels or glazes even if, for examination and otherwise, uselessly detached or chipped from the thereby thinly coated articles, this being because during their melt and formation there is not accorded opportunity for the reactions required to produce our product, and moreover the tendency is for the constituents of the enamels or glazes in contact with or proximate to the thereby covered articles to become more or less impregnated, combined and commingled with elements or substances constituting such articles, whereby is prevented occurrence of the optical and other properties contributed to our glass by titanic oxid when produced according to our aforesaid procedures.

Whenever in our herein following claims the designation "glass" is by itself employed it is to be taken to mean a vitreous substance which is the product not only of the melting together of its constituents, but also of the manipulation of the resulting product while at such temperature as to be plastic; and the term "manipulation" is to be taken to mean the designed impartation of predetermined configuration to said product, while so plastic, by aid of direct application thereto of positive formative movements, or pressures, or resistances, or either, as for example by "blowing" it, or "casting" it, or "pressing" it, etc.; and while isolated from any article with which it can coalesce, or to which ultimately adhere.

Having now described our invention, what we claim as new and desire to secure by Letters Patent is the following, viz:

1. The method of producing normally detached throughout homogeneous and uniformly-light-affected, glass-ware of definitely predetermined configuration, which comprises incorporating with the other constituents thereof titanic oxid in proportion not less than 25 per cent. of the batch, isolatedly fusing the mixture at temperatures such and so protracted as to insure chemical combination with said oxid, and manipulating the resulting molten product, while it continues plastic, to impart thereto said configuration.

2. As a new article of manufacture, normally detached glass-ware of definitely predetermined configuration, and consisting of a throughout uniform, homogeneous, mass of uniformly-light-affected glass containing not less than 25 per cent. of titanic oxid.

LOUIS E. BARTON.
HENRY A. GARDNER.

Witnesses as to Louis E. Barton:
RALPH S. TABOR,
TOM C. GRAHAM.

Witnesses as to Henry A. Gardner:
B. T. WEBSTER,
M. R. RODGERS.